United States Patent [19]

Erdmann et al.

[11] Patent Number: 4,710,359

[45] Date of Patent: Dec. 1, 1987

[54] GAS GENERATOR

[75] Inventors: Hermann Erdmann, Weyhe; Heiko Rahm, Hamburg, both of Fed. Rep. of Germany

[73] Assignee: Erno Raumfahrttechnik GmbH, Bremen, Fed. Rep. of Germany

[21] Appl. No.: 709,510

[22] Filed: Mar. 8, 1985

[30] Foreign Application Priority Data

Mar. 9, 1984 [DE] Fed. Rep. of Germany ....... 3408592

[51] Int. Cl.⁴ ..................... B01J 7/00; B01D 13/00; B01D 53/36
[52] U.S. Cl. .................................. 422/191; 422/110; 422/193; 422/222; 48/61; 55/158
[58] Field of Search .............. 422/191, 188, 193, 197, 422/202, 196, 305, 122, 123, 129, 125, 112, 110, 111, 116, 222, 211, 186, 189; 60/200.1, 207, 218, 39.462; 55/16, 476, 158, 66; 423/235, 248, 239, 645, 648 R, 213.7, 213.2, 238; 48/61

[56] References Cited

U.S. PATENT DOCUMENTS

| | | | |
|---|---|---|---|
| 3,278,268 | 10/1966 | Pfefferle | 422/198 X |
| 3,338,681 | 8/1967 | Kordesch | 422/211 |
| 3,350,176 | 10/1967 | Green et al. | 422/198 X |
| 3,450,500 | 6/1969 | Setzer et al. | 422/211 X |
| 3,607,066 | 9/1971 | Basch | 422/211 X |
| 3,995,012 | 11/1976 | Barnert et al. | 423/658 X |
| 4,022,018 | 5/1977 | Tuten et al. | 60/200.1 |
| 4,157,270 | 6/1979 | Martignoni et al. | 423/648 R X |
| 4,371,500 | 2/1983 | Papineau | 422/203 X |
| 4,490,972 | 1/1985 | Ellion et al. | 60/39.462 |

Primary Examiner—Barry S. Richman
Assistant Examiner—Jill Johnston
Attorney, Agent, or Firm—Ralf H. Siegemund

[57] ABSTRACT

A gas generator system particularly for use in satellite and orbiting space station is suggested wherein two separate process chambers are alternatingly fed with hydrazine, each chamber includes one or more gas generators proper for catalytically decomposing hydrazine into nitrogen and hydrogen, and further including, and further including two separators for separating the hydrogen from the blend and an interposed supplemental catalytic converter, the two process chambers are interconnected by an intermediate collector type chamber receiving alternatingly nitrogen enriched gas from the two process chambers, and establishing final and complete separation of hydrogen from nitrogen. Hydrogen is extracted from all three chambers; nitrogen is extracted from the intermediate connecting chamber only. The generated gas pressure can be used as energy source for driving the system.

6 Claims, 7 Drawing Figures

GAS GENERATOR

BACKGROUND OF THE INVENTION

The present invention relates to the generation of gas, particularly in orbiting space station satellites, or the like, and more particularly the invention relates to the generation of gas on the basis of a chemical reaction and/or catalytic decomposition of a, preferably, liquidous energy carrier, further including separating the resulting gas mixture or blend into its components.

Manned and unmanned orbiting space stations, as well as larger satellites, require, to an increasing extent, the utilization of regenerative processes in order to save space and weight as far as consumables are concerned, with particular view of long and extended missions. This requirement, or at least desirable feature and aspect, includes also the supply of nitrogen gas to the extent they are needed in such space vehicles. The nitrogen is, for example, used as an additive to the breathing atmosphere in the work and living quarters for the astronauts in the space station. But nitrogen is also needed as a highly desirable inert gas for conducting scientific experiments, as well as for cold gas, attitude control propulsion engines. The attitude control is often carried out through small engines using hydrogen which, particularly when used in the cold state, has a significantly higher specific impulse than nitrogen. Moreover, hydrogen is used in fuel cells and for a variety of scientific experiments in outer space. Therefore, it has been suggested to use so-called inert gas generators in order to provide for these gases under the stated situations. These generators include, for example, a hydrazine tank, a gas generator, and a hydrogen diffusion annd separating device. Moreover, hydrogen permeation devices are known which serve for the production of highly pure hydrogen, as well as for separating hydrogen from a hydrogen-nitrogen mixture. The last-mentioned type of equipment works with a vacuum system, and require an electric feeding device.

DESCRIPTION OF THE INVENTION

It is an object of the present invention to provide a new and improved gas generating device, particularly for orbiting space stations and satellites wherein chemical reaction and/or catalytic decompositioning of a preferably liquidous energy carrier, gases are produced and separated into their components.

It is therefore an object of the present invention to provide for gas generation and separation of the aforementioned typed with a high degree of reliability, and the equipment is to particularly compact for use in the cramped facilities of a space station wherein of course it is desirable to have a high specific temporal rate and yield of the respective gas components. Moreover, the device should be highly versatile in its use.

In accordance with the preferred embodiment of the present invention it is suggested to provide at least two process units, each including at least one gas generator and a process chamber with separator being interconnected through a third chamber.

In particular two process chambers are provided, each including at least one chemically and/or catalytically operating device for decomposing a liquid energy carrier to obtain a blend of gas; preferably hydrazine is catalytically decomposed into hydrogen and nitrogen. Each process chamber includes a separator such as separator tubes with a membrane made of palladium in the case of hydrazine decomposition for separating the components of the gas as produced amounting for example to an enrichment of the blend with nitrogen, while hydrogen is being extracted. The third chamber interconnects the two process chambers and alternatingly receives from them the enriched blend, the third chamber includes means for completing the separation of the gas components and possibly carries out supplemental catalytic decomposing. The entire unit is preferably jacketed in insulation, and certain components such as valves, ducts or the like are at least in parts embedded in that insulation. The system includes a feed chamber, which is operated by the gas that is developed in the system to obtain for example an alternating charging of the process chambers with the liquidous energy carrier, such as hydrazine. The entire device is therefore to a considerable extent autonomous and requires little or no outside energy. While developed particularly for space technology, the gas generator is not limited to utilization in that field.

DESCRIPTION OF THE DRAWINGS

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawings in which:

Figure 1:
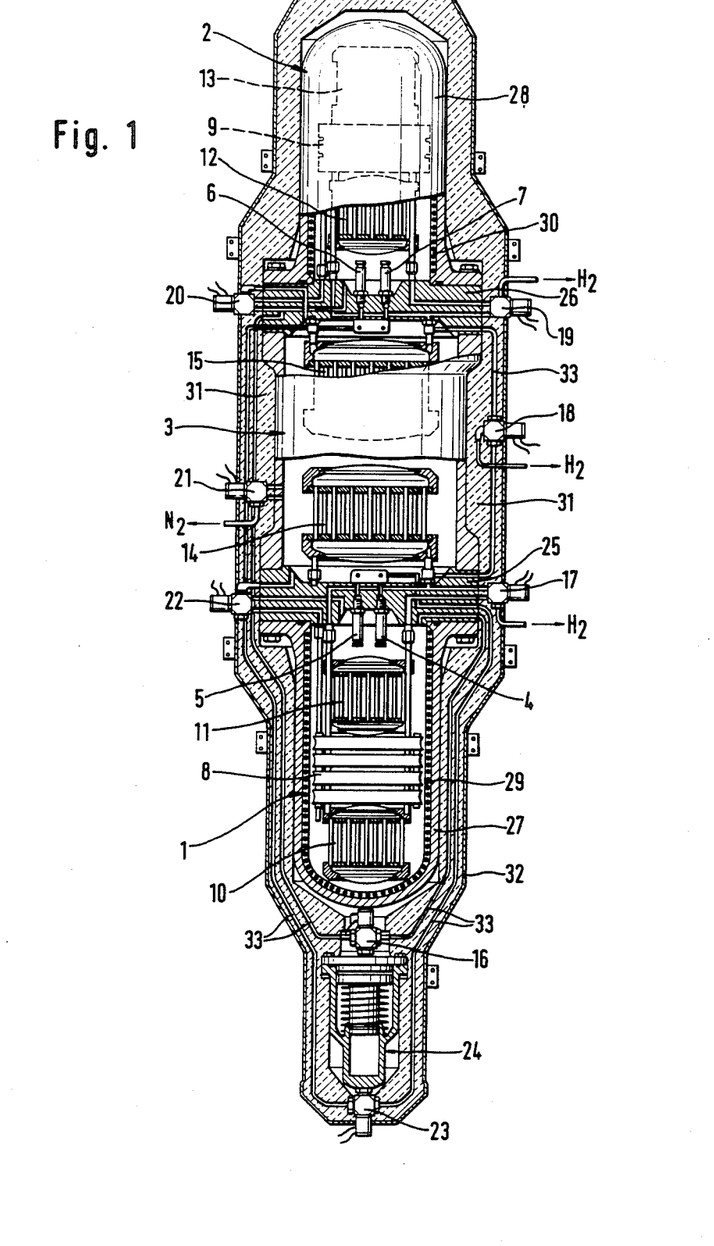
FIG. 1 is a cross section through a gas generator in accordance with the preferred embodiment of the present invention for practicing the best mod thereof.

Proceeding now to the detailed description of the drawings, FIG. 1 illustrates a gas generator device which is constructed as a modular system for the generation and separation of nitrogen and hydrogen using hydrazine as raw material or fuel. The system is comprised first of all of two separated process chambers 1 and 2, which are arranged so as to face each other, and they are interconnected through a third chamber 3.

The two process chambers 1 and 2 include one or several, such as the case is here, gas generators such as 4 and 5 being disposed in process chamber 1, there being gas generators 6 and 7 disposed in process chamber 2. Also, each of these chambers 1 and 2 includes a post or supplemental catalytic device 8 and 9, respectively, and there are two sets of hydrogen separating units, 10 and 11, being associated with chamber 1, two hydrogen separating units 12 and 13 are associated with chamber 2. The construction of these components will in the following be explained more fully. Presently, it suffices to say that each of the process chamber 1 and 2 is associated with still another hydrogen separating unit 14 and 15, respectively, being arranged in the interior of an intermediate chamber 3 which connects to both access chambers.

The device includes furthermore a plurality of magnetically operated valves 16 through 23, which control the conduction of gas for purposes of controlling the process at large. The function of these valves will be explained in greater detail below. In addition, the device includes a feed unit 24 generally for providing the gas generators 4,5,6 and 7 with the energy carrier, i.e., hydrazine.

Figure 2:
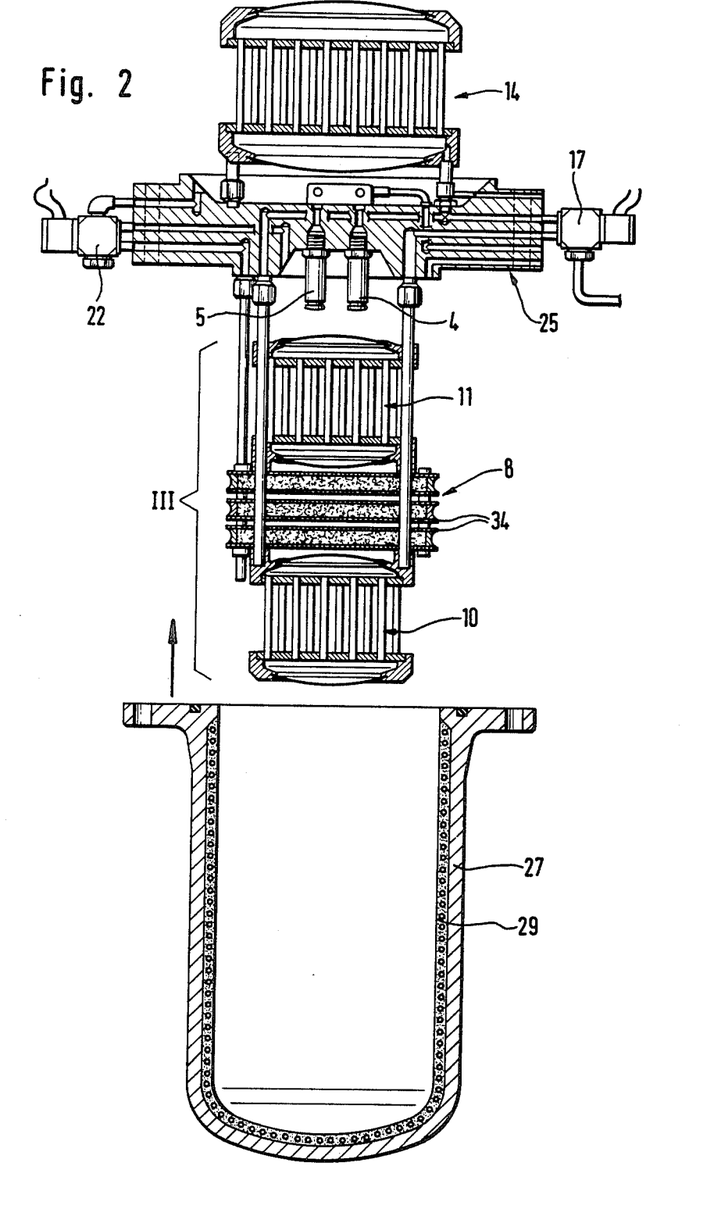
FIG. 2 illustrates a section view on a larger scale of a portion of the device shown in FIG. 1.

As shown in FIG. 2, certain parts are mounted on common flanges or mounting annuli such as 25 and 26. For example, the gas generators 4 and 5, the two separating units 10 and 11, and the post or supplemental catalytic device 8 constitute a common group for chamber 1 and they are mounted on the flange 25, as per FIG. 2. The separating unit 14 is likewise mounted to this flange 25, so are the valves 17 and 22. Analogously, there is a flange 26 on which are mounted the gas generator 6,7, the separating units 12, 13 and 15, the post catalytic device 9, as well as the valves 15 and 20. This group of elements pertains to process chamber 2.

The figures furthermore show that the two process chambers 1 and 2 are, respectively, enclosed in hoods 27 and 28. In each of these hoods there is respectively arranged an annular electrical heating elements, 29 in hood 27, and heating element 30 inside hood 28.

The hoods 27 and 28, as well as the chamber 3, and the cylindrical unit 24 are embedded in an almost completely closed jacket 31 made of a thermally insulating material. The jacket 31 in turn is enclosed in a metal sheet, cover or envelope 32. The insulating jacket 31 includes the remaining valves not directly connected to the flanges 25 and 26. Also, the major portion of the conduits 33 between the various process chambers are embedded in this jacket 31.

Figure 3:
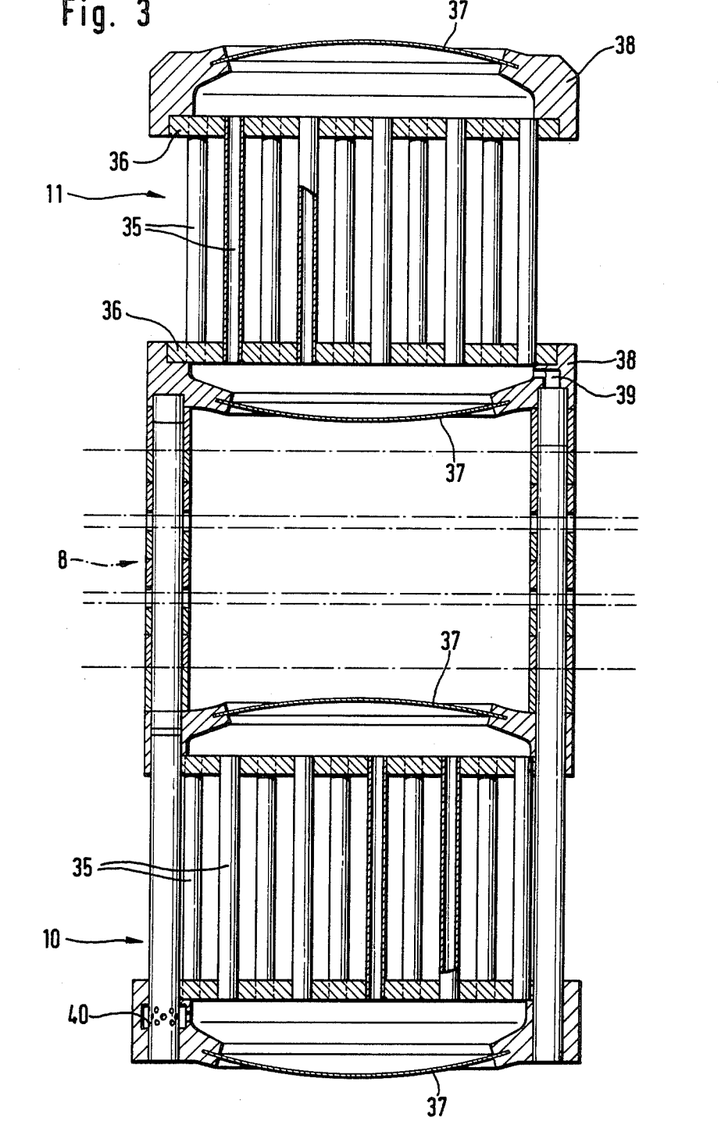
FIG. 3 shows a detail to an enlarged scale and as indicated by III in FIG. 2.

Turning now to FIG. 3 the two separating units 10 and 11 are illustrated in greater detail. The units 10 and 11 are respectively connected to operationally precede and to succeed in terms of process direction and timing, the post and supplemental catalytic device 8. Altogether these units form a particular mounting assembly or modular unit. However, it should be mentioned that the post or supplmental catalytic system 8 may be omitted because the separators, if made of palladium, may sufficiently carry out this post and supplemental catalytic function. For reasons of clarity in the illustration, FIG. 3 does not show the post catalytic converter but only the location where it might be; the catalytic device 8 is fully shown in FIG. 2. This catalytic device 8 is comprised of several discs 34 which are constructed as mesh or sieve-like webbing, or the like, and arranged in between respective two annular aperture plates.

The separator units 10, 11 and analogously of course also the separator units 12 and 13, are established by a plurality of separating tubes 35 made of palladium. These tubes are combined by means of annular aperture plates 36 to establish a cylindrical unit or units. At the respective ends these units are closed by outwardly bulging separating membranes 37 being likewise made of palladium, and embedded in annular holding rings 38.

FIG. 3 also show the two discharge or extracting points 39 and 40 for the hydrogen gas which is collected underneath the separating membranes. FIGS. 1 and 2 moreover show that the construction of the two separator units 14 and 15 is essentially the same as was just described, but the number of separator tubes is larger, and their diameter is also larger, as compared with the respective number and diameters of the separator tubes in separator units 10, 11, 12 and 13.

Figure 4:
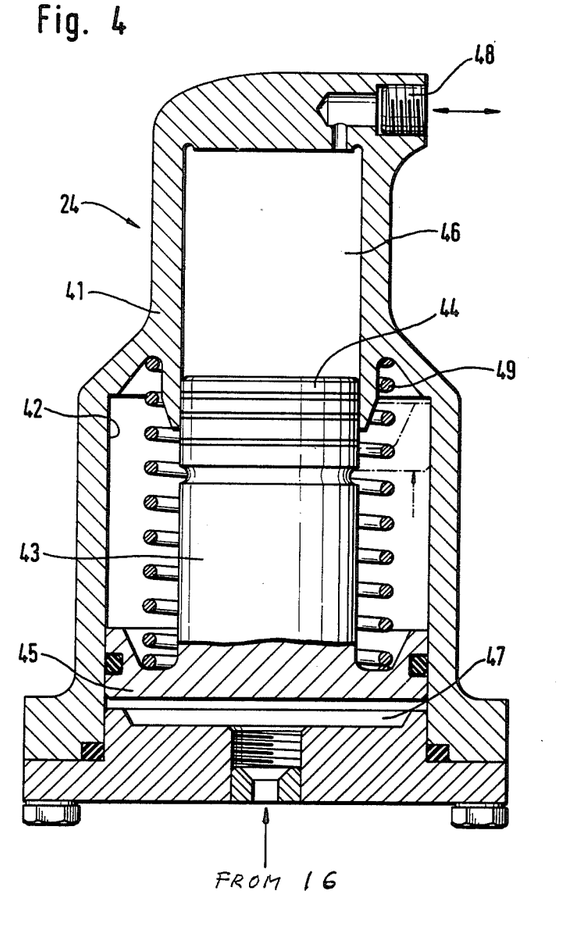
FIG. 4 illustrates another detail of the device shown in FIG. 1.

Turning now to FIG. 4, there is illustrated the construction of the feed unit 24 by means of which hydrazine is fed into the system. This feeder unit 24 includes a casing 41, in the interior of which is provided a piston chamber 47 defined by a bore 42, and a plunger 43 is longitudinally slidably disposed therein. This plunger 43 carries a piston 44 at one of its ends and second piston 45 at the opposite end, whereby the diameter of the piston 45 is larger than the diameter of the piston 44. The two pistons move in piston chambers 46 and 42 respectively, the piston chamber 46 being associated with the smaller piston 44, and being of smaller diameter accordingly.

A ball valve 48 is connected to the chamber 46 for connecting a supply store for the energy carrier hydrazine to the feeder unit. The store for hydrazine is not shown by itself (but see FIG. 5, item 50). In addition, the piston chamber 46 is connected to the gas generators 4, 5, 6 and 7 through a magnetically operated valve 23 and further through a branch of the conduit system 33. Analogously, the piston chamber 47 is governed by a magnetic valve 16, and through this valve it is connected in turn to another branch of the conduit system 33 to receive process gas. Finally, unit 24 is provided with a coil spring 49 which envelopes the plunger 43 and acts upon the piston 45. The other end of the spring 49 bears against a suitable shoulder support inside casing 41.

The operation of the device shown in FIG. 4 follows directly from the particular illustration. Whenever the piston system 44, 45, i.e., the plunger 43, is forced by means of the spring 49 into the piston chamber 47, hydrazine is sucked into the piston chamber 46. Subsequently, process gas is caused toact on the piston 45 so that the piston system is forced into the piston chamber 46. This is in turn causes the valve 48 to close, but in the meantime valve 23 has been opened (FIG. 1 and 5) and the hydrazine is forced from the piston chamber 46 through the branch system 33 either into the gas generators 4 and 5, or into generators 6 and 7 in order to obtain catalytic decomposition therein, so that the respective process chamber, 1 or 2, is filled with the gas that is formed by the decomposition process. That gas is used interalia to move piston 45 so as to empty chamber 46 from its hydrazine charge. Furthermore, it should be mentioned that the valves 16 and 23 shown in FIG. 1 have been omitted in FIG. 4 for reasons of simplification in the illustration.

Figure 5:
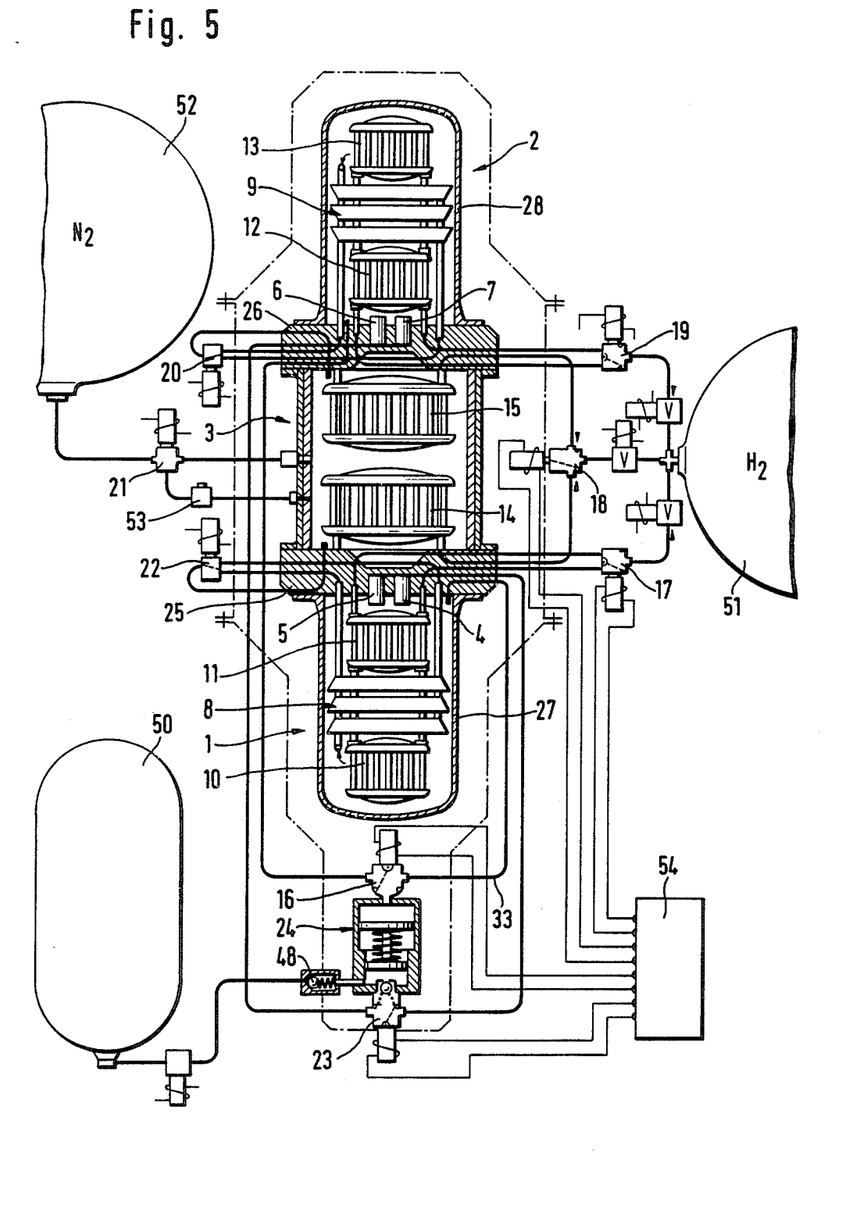
FIG. 5 is a schematic illustration of a highly autonomous gas generating system which incorporates the device shown in FIG. 1.

FIG. 5 now illustrates somewhat schematically the construction of a largely autonomous gas supply system for hydrogen and nitrogen. This complete system as illustrated in FIG. 5, is basically comprised of the structure and of the elements described above with reference to FIGS. 1, 2, 3 and 4. The basic components shown in these figures are represented in their essential parts in the center of FIG. 5. However, in addition, FIG. 5 shows a store 50 for the hydrazine, i.e., the energy carrier, as well as collecting tanks 51 and 52, respectively, for the generated hydrogen an nitrogen gases. In addition, the system will include an electronic processor 54, which provides for the requisite control of the system as a whole.

It shall now be described with reference to FIG. 5, how the entire gas generating equipment functions. This system is basically constructed as an autonomous unit, in other words it is independent from any external sources of energy. The only outside input, so to speak, needed are start-up signals, etc., for the electronic controller and process computer 54. The process control should be maximized particularly for obtaining on one hand optimum conditions in the process as such, while on the other hand the rates of hydrogen and nitrogen production and their separation from each other are to be maximized. Generally speaking, it was found to be of advantage to have the two process chambers 1 and 2 opposite out of phase. In other words, each of these devices operates on a cyclic basis, and there is 120 degrees phase shift in between the operation of the two chambers. Each device (process chamber) works for about 240 degrees cycle time so that there is sufficient overlap. Moreover the process energy which is released in one chamber can be used for producing the requisite pumping power, and for effecting the gas transport through the conduit system. This mode of operation will be described in the following.

As we already mentioned with reference to FIG. 4, the feed unit 24 provides briefly a hydrazine charge to the gas generators 4 and 5 and 6 and 7. For initializing the entire system, one may need a starting pulse, for example, the pressure build in some suitable location. The magnetic valve 23 causes hydrazine to leave the piston chamber 46 of the feed unit 24. This valve is provided as a switch in such a manner that only one of the two process chambers, i.e., the gas generators therein, will at any given moment receive hydrazine.

The respective gas generators provide a hydrogen-nitrogen blend resulting from catalytic decompositioning of the hydrazine, and this blend enters the respective process chamber, for example, process chamber 1. The two separator units 10 and 12 being disposed in the process chamber 1 partially separate hydrogen from the nitrogen-hydrogen blend. The post or supplemental catalytic device 8 being provided in the process chamber 2 furthermore makes sure that any $NH_3$ residue that may be contained in the blend will also be decomposed into the components, hydrogen and nitrogen.

Following the process cycle portion just described, the gas blend having a higher nitrogen content that the initially generated one is fed from chamber 1 through the switch valve 22 into the third chamber 3, which can also be considered to be an intermediate collector chamber. In other words, the valve has at least three operating positions: off; feed 1; feed 2. The discharge from process chamber 1 is carried out in front of, as well as behind, the post and supplemental catalytic device 8, whereby an alternating process controlled cycle causes a continuous change in gas flow through the post and supplemental collector 8 to thereby enhance further decomposition of the $NH_3$ residue within the process chamber.

Separator units 14 and 15 as provided in the intermediate collector chamber 3 do now ensure a complete separation of the remaining hydrogen from the initial blend. The separated hydrogen is collected in the pre-separator units 10 of chamber 1 and in pre-separator unit 12 of chamber 2, as well as in the post-separator units 14 and 15, respectively, underneath the respective palladium membranes in each instance. The switch valves 17 and 18 cause the collected hydrogen to be fed from the collecting spaces to the collector tank 15. There remains then only nitrogen in the intermediate collector 3, and this nitrogen is fed through the valve 21 to the nitrogen collecting tank 52.

Thus far only is a gas generating process and cycle involving only the process chamber 1 has been described. However, as the decomposition and separating process still continues in the process chamber 1, at for example, about one third of that process time has been elapses the gas generators of the second process chamber 2 will briefly receive a certain amount of hydrazine and in a manner described above in connection with the feed unit 24. And now an analogous process will begin in the process chamber 2. The switch valve 19 serves here for removing the hydrogen gas and to feed that gas to the separator unit 12 and 13. The valve 20 is provided for finally feeding the nitrogen enriched blend also into the intermediate collector chamber 3. This is likewise carried out in alternating cycles in front of and behind the post and supplemental catalytic device 9 in this particular portion.

Since the operating phases in the two process chambers overlap, one can use the operating pressure that is generated in one of the respective chambers 1 or 2, i.e., the pressure of the process gas that is released by the decomposition process, as a power source for obtaining the respective pumping power for the other chamber (2 or 1). Therefore, the system does not require, for example, any external electric pumping power. Since operation between the two chambers alternates, one can proceed in that temporarily process gas is extracted to be used as energy source for a pump, and the pumper gas feed back into the system without any loss in substance; one uses only its enthalpy.

An important feature is that the nitrogen enriched process gas is fed to the intermediate collection chamber 3 from either of the two process chambers in alternating fashion from in front and from behind the respective post and supplemental catalytic device therein. This approach favors a complete catalytic decomposition of any $NH_3$ residue simply because movement of gas is forced upon the system as follows a program controlled, alternating and cyclic operation of the extraction valves 17 and 19 for the discharge of the separated hydrogen from the respective separator unit, is instrumental for obtaining in fact a sufficiently strong gas movement into the respective collecting tank, simply by operation of the palladium surfaces which cause the separation. This movement of gas is of course an essential requirement for thoroughly separating the various components from the blend as it is produced. The same is true with regard to the clocked operation of the valves 18, which control the extraction from the two post-separator units 14 and 15.

After completion of the process as it involves the first chamber 1, after the transfer of the nitrogen enriched process gas into the intermediate chamber 3 the chamber 1 experiences a pause. Following the completion of the process in the second chamber 2, chamber 1 will receive a new charge of hydrazine while, as far as chamber 2 is concerned, an extraction cycle, o.e., a transfer of process gas, begins from the chamber 2 to the intermediate collection chamber 3.

The extraction of hydrogen gas from the process chambers, including the intermediate chamber 3, and conduction into the collecting tank 51, will be carried out, from an overall point of view, throughout the entire process period. During roughly the last third of a full process cycle, gas flows from the first process chamber (1 or 2) into the intermediate chamber 3, following which gas flows from the second process chamber (2 or 1) into the collecting chamber 3, for about the same length of time. A pause following as far as this third chamber (3) is concerned. It can thus be seen that within the entire process period and cycle a sufficient residence time is ensured within the intermediate chamber 3, while the other hand, counter pressure in this intermediate chamber will not unduly rise that may interfere with the hydrogen extracting from chambers 1 and 2.

Nitrogen gas may be extracted from the intermediate chamber 3 via the valve 21 during a certain period towards the end of the residence time of the process gas in the intermediate chamber, or one may control the extraction of nitrogen through the use of opposite pressure levels. For example, a pressure monitor 53 is provided for the intermediate chamber 3, nitrogen may be discharged by opening of valve 21.

Depending upon the period of time necessary for a complete separation of the gas blend into its components, but with otherwise equal cycle time, the residence time of the gas in the intermediate collecting chamber 3 can be extended. The duration of this residence time may, for example, be controlled through a sensor being sensitive to the presence of hydrogen in the chamber 3. In particular, this measuring device may respond to the hydrogen dilution in that chamber, and when the hydrogen content has dropped below a particular threshold value indicating that the hydrogen content is very low, a control is provided to the valve 21 for initiating the extraction of nitrogen.

Figure 6:
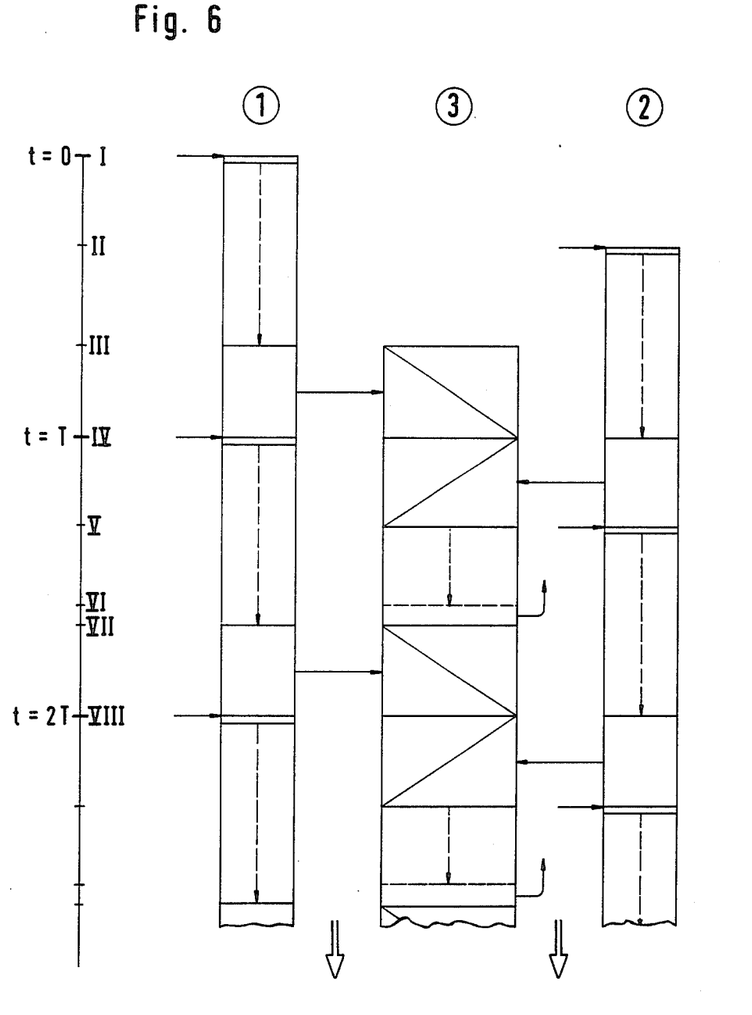
FIG. 6 is a synchronous optical illustration of the process carried out in the equipment shown in FIG. 1 and others.

FIG. 6 is a schematic representation of the operating cycle described in the foregoing and involving the operation of the inventive device. The plot is shown in a synchronous optical fashion. The left-hand margin of FIG. 6 shows the time axis and the process is assumed to begin at the time $t=0$. The bars in three columns show respectively certain phases of operation in chambers 1, 3 and 2.

A full process cycle period can be defined in duration, for example, between the beginning of two sequential charge periods of any individual process chamber with hydrazine. It may therefore be assumed that in time $t=0$ process chamber 1 receives an initial charge of liquid hydrazine. The Roman numerals I through VIII denote various phase points in the process to be described below. The phase point I at time 0 therefore is the arbitrarily established beginning of a process cycle which may be initiated by operation of the feed unit 24, for example, through a pressure signal of 20 bars from the outside. As states, that process phase point I marks the beginning of feeding hydrazine to the process chamber 1.

The phase point II marks the beginning of the same operation for the process chamber 2, occurring approximately half way through the process as it is carried out in chamber 1, which is roughly one-third through the first cycle period T. Thus during phase point II the gas pressure in chamber i is used, via valve 16, to force large piston 45 (FIG. 4) through chamber 42 so that piston 44 can force hydrazine from chamber 46 into chamber 2, valve 23 having been switched to the appropriate position.

At point III, which is about two-thirds through the first process cycle T, the discharge from chamber 1 begins, i.e., at that time nitrogen enriched process gas will be fed into the intermediate chamber 3.

At point IV the first cycle is completed, i.e., chamber 1 can again be fed with hydrazine, which is course means that the feeding of process gas into the chamber 3 from chamber 1 is likewise completed. On the other hand, the phase point IV also denotes the end of the process in chamber 2, and the discharge from chamber 2 into chamber 3 is completed, and now chamber 2 will again receive a new charge of hydrazine. At that point in time of course the process in the chamber 1, is in its second cycle and as far as chamber 1 is concerned, has been about half way completed.

The period of time between the phase points V and VII is indicative of the residence time of process gas in the intermediate collecting chamber 3, and is determined by the period of time needed to completely separate the two gas components from the blend i.e. from each other. At the instant or phase point vi, discharge of nitrogen begins from the chamber 3, lasting to about phase point VII. The extraction of hydrogen from the various points, however, is a more or less continuous process throughout the entire process. Phase point VIII finally denotes the completion of the second period of operation as far as the chamber 1 is concerned, and one can readily see, by comparing the various columns, how the process continues on a cyclic basis as far as each of the process chambers is concerned with a phase shift occurring in between.

The foregoing illustration demonstrates that the operation of the inventive apparatus provides for a selection of cycle times, residence times and discharge periods and instants to obtain definite overlap as far as the operation of the two chambers 1 and 2 is concerned. This kind of boxer operation is, however, not essential in principle. It simply is a mode of operation in which the gas production and extraction rates, and a large amount of gas production on a continuous basis has in fact been optimized. Other modes of operations are of course possible, being however, less efficient. Moreover, the process description permits recognition of the fact that the design of the inventive arrangement as a two-chamber system does no only permit a very efficient operation, but also establishes a rather compact overall configuration. In addition, one obtains a system redundancy, because if there is, for example, a failure in one of the subsystems, the others will continue.

Figure 7:
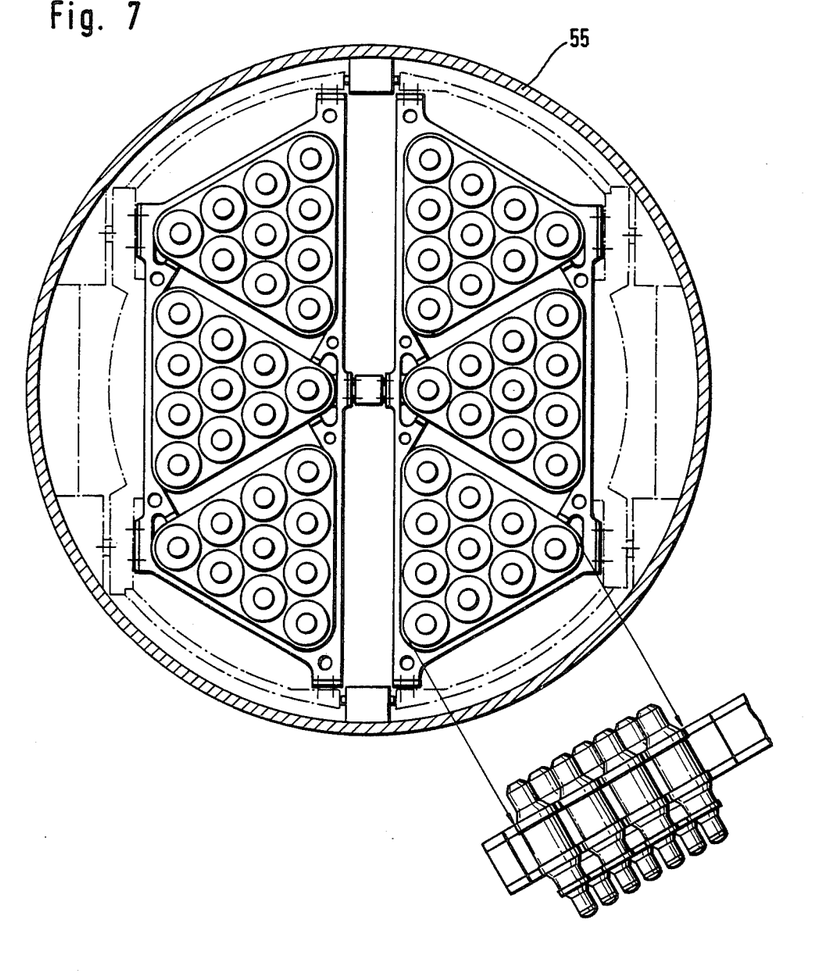
FIG. 7 is an example for combining several devices in accordance of FIG. 1 to a modularly constructed, large gas generating system.

FIG. 7 now finally illustrates that gas generator devices when constructed in accordance with the principle of this invention, and particularly in view of the module type of construction and design, may be used to provide larger module type of construction and design, may be used to provide larger module clusters. FIG. 7, therefore, illustrates by way of example a combination of altogether sixty devices, each being constructed as shown in FIG. 1. They are combined in six triangular clusters, each cluster containing ten devices of the type shown in FIG. 1, and being enclosed in a cylindrical structure 55 pertaining, for example, to an orbiting space station.

Finally, it should be mentioned that the integrated arrangement of a large part of the components and their mounting of the two flanges 25 and 26 is highly beneficial in any exchange procedure. In other words, the flanges with attached components can be removed rather quickly as a whole for purposes of exchanging such a sub-unit for another one. In addition, of course this type of construction facilitates testing whereby, for example, through simple insertion of spacer rings between flange and the respective hood, or between one of the flanges and the intermediate collector 3, one can actualy obtain an increase in volume of the respective process chamber. Furthermore, it is simply possible in this manner to subject a portion of the components to a function test, particularly during step-wise assembly.

The invention is not limited to the embodiments described above, but all changes and modifications thereof not constituting departures from the spirit and scope of the invention are intended to be included.

We claim:

1. Gas generator device for use in orbital space stations, satellites, or space vehicles comprising:
   a first and a second process chamber, each including at least one catalytic means for decomposing a liquid energy carrier to obtain a blend of pressurized gas, each of said first and second process chambers further including (i) a first separator for separating the components of the gas as produced by said catalytic means (ii) a supplemental catalytic converter for receiving residual pressurized gas and (iii) a second separator connected to said supplemental catalytic converter for separating product gas from the pressurized gas produced therein;
   a first means for removing gas produced in each of said process chambers from said generator device;
   a third common chamber
   intermediate said first and second process chambers, means alternatingly communicating said third chamber with said first and second process chambers for receiving unseparated product gas from the second separator thereof and including means for completing the separation;
   a plurality of second means for separately removing different individual components of the gaseous components from said third intermediate chamber separating means; and
   means for alternatingly feeding liquidous energy carrier to the first and second process chambers.

2. Gas generator as in claim 1 wherein each of said process chambers includes a mounting platform to which is mounted the catalytic means, the supplemental catalytic converter, and the first and second separators.

3. Gas generator as in claim 1 further including a thermally insulative jacketing means enclosing said first and second process chambers and said third intermediate chamber, said thermally insulative jacketing means containing conduit means embedded therein connecting said feeding means to each of said process chambers.

4. Gas generator as in claim 1 wherein each of said first and said second separators comprises a plurality of palladium tubes positioned in a parallel configuration and a pair of palladium membrane tube sheets, the ends of said tubes terminating in a respective one of said tube sheets.

5. Gas generator as in claim 1, and including means for controlling said means for alternatingly feeding liquidous energy carrier to said first and second process chambers, said first and second gas removing means, as well as said unseparated product gas transfer to the third intermediate chamber such that each of said process chambers is operated to begin with a charge phase following which, and for about two thirds of a cycle time, decomposing occurs in said catalytic means, while during the remainder of the cycle time gas is transfered from the respective process chamber to the third intermediate chamber, there being a one third overlap in operation of the first and second chambers during which period a separated product gas is removed from the third intermediate chamber.

6. Gas generator as in claim 1, wherein said feeding means is connected to the process chambers for using pressurized gas as developed in one of the process chambers for operating said feeding means for supplying liquidous energy carrier to the other of said process chambers.

* * * * *